US010377396B2

(12) United States Patent
Becherer et al.

(10) Patent No.: US 10,377,396 B2
(45) Date of Patent: Aug. 13, 2019

(54) AMUSEMENT PARK DEVICE HAVING A RAIL-GUIDED ROUTE COURSE AND HAVING AT LEAST ONE VEHICLE GUIDED ON THE RAIL

(71) Applicant: MACK RIDES GMBH & CO. KG, Waldkirch (DE)

(72) Inventors: Markus Becherer, Elzach Prechtal (DE); Timo Lässle, Kappel-Grafenhausen (DE)

(73) Assignee: MACK RIDES GmbH & Co. KG, Waldkirch (DE)

( * ) Notice: Subject to any disclaimer, the term of this patent is extended or adjusted under 35 U.S.C. 154(b) by 223 days.

(21) Appl. No.: 15/111,027

(22) PCT Filed: Apr. 2, 2015

(86) PCT No.: PCT/EP2015/057356
§ 371 (c)(1),
(2) Date: Jul. 12, 2016

(87) PCT Pub. No.: WO2015/150539
PCT Pub. Date: Oct. 8, 2015

(65) Prior Publication Data
US 2016/0347334 A1    Dec. 1, 2016

(30) Foreign Application Priority Data
Apr. 2, 2014  (DE) .................. 10 2014 104 659

(51) Int. Cl.
*B61H 7/04*   (2006.01)
*A63G 7/00*   (2006.01)
(Continued)

(52) U.S. Cl.
CPC .................. *B61H 7/04* (2013.01); *A63G 7/00* (2013.01); *B61H 7/12* (2013.01); *F16D 55/2255* (2013.01);
(Continued)

(58) Field of Classification Search
CPC .................................... B61H 7/04; B61H 7/12
See application file for complete search history.

(56) References Cited

U.S. PATENT DOCUMENTS 5,836,821 A  *  11/1998  Yamada .................... B62D 1/16
                                                                          464/89
8,157,060 B2 *   4/2012  Gremaud .................. B66B 5/16
                                                                          188/43
(Continued)

FOREIGN PATENT DOCUMENTS

AT            82624 B        2/1921
CN        202569471 U       12/2012
(Continued)

OTHER PUBLICATIONS

International search report for related application PCT/EP2015/057356, dated Jun. 24, 2015.
(Continued)

*Primary Examiner* — Zachary L Kuhfuss
(74) *Attorney, Agent, or Firm* — William Gray Mitchell

(57) ABSTRACT

The invention is an amusement-park device, comprising a rail-guided route course and at least one vehicle guided on the rail, which vehicle has a brake apparatus having at least one, preferably two brake pads fastened to a brake-pad carrier, which brake pads are provided for braking or clamping the vehicle at a point of the rail-guided route course during a braking event. According to the invention, the brake apparatus has a brake carrier and/or the at least two brake pads can be pivoted in relation to the stationary bike carrier.

(Continued)

The vehicle equipped with such a brake apparatus can follow unevenness in the rail-guided route course in a simple manner, resulting in reliable braking behavior.

21 Claims, 4 Drawing Sheets

(51) Int. Cl.
*F16D 63/00* (2006.01)
*F16D 55/2255* (2006.01)
*B61H 7/12* (2006.01)
*F16D 121/02* (2012.01)
*F16D 121/20* (2012.01)

(52) U.S. Cl.
CPC ........ *F16D 63/008* (2013.01); *F16D 2121/02* (2013.01); *F16D 2121/20* (2013.01)

(56) References Cited

U.S. PATENT DOCUMENTS 9,145,282 B2 * 9/2015 Schautt ..................... B66B 5/18
2004/0099492 A1 5/2004 Onuki
2014/0299425 A1 * 10/2014 Schautt ..................... B66B 5/18
188/158
2017/0328425 A1 * 11/2017 Kalra ..................... F16D 63/008

FOREIGN PATENT DOCUMENTS

| DE | 3226905 A1 * | 1/1984 | ............... B61H 7/12 |
| DE | 3708797 A1 * | 10/1987 | ............... B61H 7/12 |
| DE | 43 36 954 | 10/1993 | |
| DE | 4336954 C1 * | 3/1995 | ............... B61H 7/12 |
| DE | 299 80 001 U1 | 6/2000 | |
| DE | 102009015529 A1 | 10/2010 | |
| DE | 202011107776 U1 | 1/2012 | |
| EP | 0424684 A2 * | 5/1991 | ............. B60T 7/128 |
| WO | WO 90/007963 | 7/1990 | |

OTHER PUBLICATIONS

EPO office action for parallel European application 15 714 220.9, dated Jun. 25, 2018.
JPO office action for parallel Japanese application 2016-554738, dated Nov. 27, 2018.

* cited by examiner

AMUSEMENT PARK DEVICE HAVING A RAIL-GUIDED ROUTE COURSE AND HAVING AT LEAST ONE VEHICLE GUIDED ON THE RAIL

CROSS REFERENCE TO RELATED APPLICATIONS

This patent application claims priority International Patent Application PCT/EP2015/057356, filed on Apr. 2, 2015, and thereby to German Patent Application 10 2014 104 659.5, filed on Apr. 2, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to an amusement park device having a rail-guided route course and having at least one vehicle guided on the rail.

Background of the Invention

The invention relates to an amusement park device with a rail-guided route course as well as at least one vehicle guided on the rail, comprising a brake device with at least one, preferably two brake pads fastened at a brake-pad carrier for braking and/or clamping tight the vehicle at a point of the rail-guided route course during a braking event.

Such amusement park devices with rail-guided route courses have been known for many years. Here, in addition to the question of how the vehicles are driven on the rails, another important safety aspect includes the provision of a suitable braking device, in order to allow the secure braking and/or stopping of the vehicles during operation.

Different braking concepts have become known for such amusement park devices, such as in carousels, rollercoasters, or rail trains. One of the first braking means for such amusement park devices was described by Thompson in AT 82624 in 1921. Here, Thompson describes a braking mechanism which allows for the control of the speed of the vehicles and to completely stop the vehicle in critical situations. Thompson describes a vehicle brake which was operated via a lever by a person in the train. Here, a mechanism presses brake pads upon a friction bar installed along the entire rail track. Due to the friction generated here a portion of the kinetic energy of the train is converted into heat and the train slows down.

However, this braking technology is today used in only few rail-guided route courses, such as for instance the so-called "Rutschebanen" in Tivoli (Copenhagen, Denmark).

A different braking mechanism is used in modern carousels and rollercoasters. Here, the braking mechanism is moved away from the vehicle to the rail track. A so-called braking strut, located at the vehicle, engages brake pads of friction brakes, with the brake pads being placed at certain points of the carousel or roller coaster at the rail. When a vehicle and its brake strut passes such friction brakes, the strut engages between the brake pads of these friction brakes and is clamped here, when the brake is activated. The brakes are here regularly opened by pneumatic or hydraulic actuators against a preloaded spring force.

Beginning in the mid-nineties, then the so-called eddy current brake has been used as a magnetic variant of such braking systems fastened at the rails. An example of such eddy current brakes for rollercoasters is shown in DE 20 2012 100 896 U1.

Although, as shown above, the development of braking devices for carousels and rollercoasters has resulted in very powerful and effective brake devices, here it is however disadvantageous that the vehicles cannot be braked and stopped at any desired points of the route course but only in those sections and/or blocks at which such brake devices are actually fastened at the rail.

A return to a brake mechanism fastened at the vehicles of such amusement park devices was prohibitive though, since the rail-guided route course of rollercoasters frequently shows extremely tight curves and additionally unevenness and tolerances occur over the route course, so that conventional brake devices located at the vehicle cannot be used.

This is the foundation for the present invention.

BRIEF SUMMARY OF THE INVENTION

In a preferred embodiment, an amusement park device comprising a rail-guided route course as well as at least one vehicle guided on the rail (10), comprising a brake device (20) with one, preferably two, brake pad(s) (40, 50) fastened at a brake pad carrier (30) for braking and/or clamping tightly the vehicle at a point of the rail-guided route course in case of a braking situation, characterized in that the brake device (20) comprises a brake carrier (22), which is arranged fixed at the vehicle, and pivoting means are provided by which the brake pad carrier (30) and/or at least two brake pads (40, 50) are pivotal in reference to a fixed brake carrier (22).

In another preferred embodiment, an amusement park device as described herein, characterized in that the brake pad carrier (30) is arranged in a pivotal fashion parallel in reference to the rail (10) on the rail-guided route course.

In another preferred embodiment, an amusement park device as described herein, characterized in that the brake pad carrier (30) is pivotal by at least approximately +/−5° to +/−15° and in the direction of motion of the vehicle on the rail-guided route course and opposite thereto.

In another preferred embodiment, an amusement park device as described herein, characterized in that a pivotal pin (24) is connected fixed to the brake carrier (22), that the swivel pin (24) comprises a cylindrical exterior contour (25) with a flange (27), circumferential and projecting therefrom, and that the brake pad carrier (30) annularly encompasses the circumferential flange (27) and is rotationally supported via a slip ring (29) at the cylindrical exterior contour (25) of the swivel pin (24).

In another preferred embodiment, an amusement park device as described herein, characterized in that the brake carrier (22) comprises a first stop (22a) and a second stop (22b), at which a stop pin (32) of the brake pad carrier (30) contacts according to a predetermined maximum pivotal angle ($W1_{max}$).

In another preferred embodiment, an amusement park device as described herein, characterized in that a buffer element (70) is arranged respectively between the stop pin (32) of the brake pad carrier (30) and the first stop (22a) on the one side and the second stop (22b) of the brake carrier (30) at the other side.

In another preferred embodiment, an amusement park device as described herein, characterized in that the brake pad carrier (30) comprises a first bake caliper part (34) for fastening the first brake pad (40) and a second brake caliper part (36) for fastening the second brake pad (50), with the first brake caliper part (34) and the second brake caliper part (36) respectively being supported floating in a brake caliper console (38).

In another preferred embodiment, an amusement park device as described herein, characterized in that both by the first brake caliper part (34) as well as the second brake caliper part (36) each spring-loaded pins (80, 82) are provided for the floating support, with the pins (80, 82) being held at the brake caliper console (38).

In another preferred embodiment, an amusement park device as described herein, characterized in that both the first brake caliper part (34) as well as the second brake caliper part (36) each show a fastening element (42, 52) at which the first and second brake pad (40, 50) are respectively fastened, with each fastening element (42, 52) comprising on a main area facing away from the respective brake pad (40, 50) an arched exterior contour, which corresponds in a form-fitting fashion to a second fastening element (44, 54) fixed at the respective brake caliper part such that the respective brake pad (40, 50) is supported in a pivotal fashion.

In another preferred embodiment, an amusement park device as described herein, characterized in that each of the two brake pads (40, 50) is pivotal perpendicular in reference to the direction of travel of the vehicle at an angle from approx. +/−1° to approx. +/−5°.

In another preferred embodiment, an amusement park device as described herein, characterized in that the two brake pads (40, 50) in the idle state of the brake device (20) and thus when the brake device (20) is open show a distance from >20 mm, preferably <30 mm in reference to each other.

DETAILED DESCRIPTION OF THE INVENTION

Figure 1:
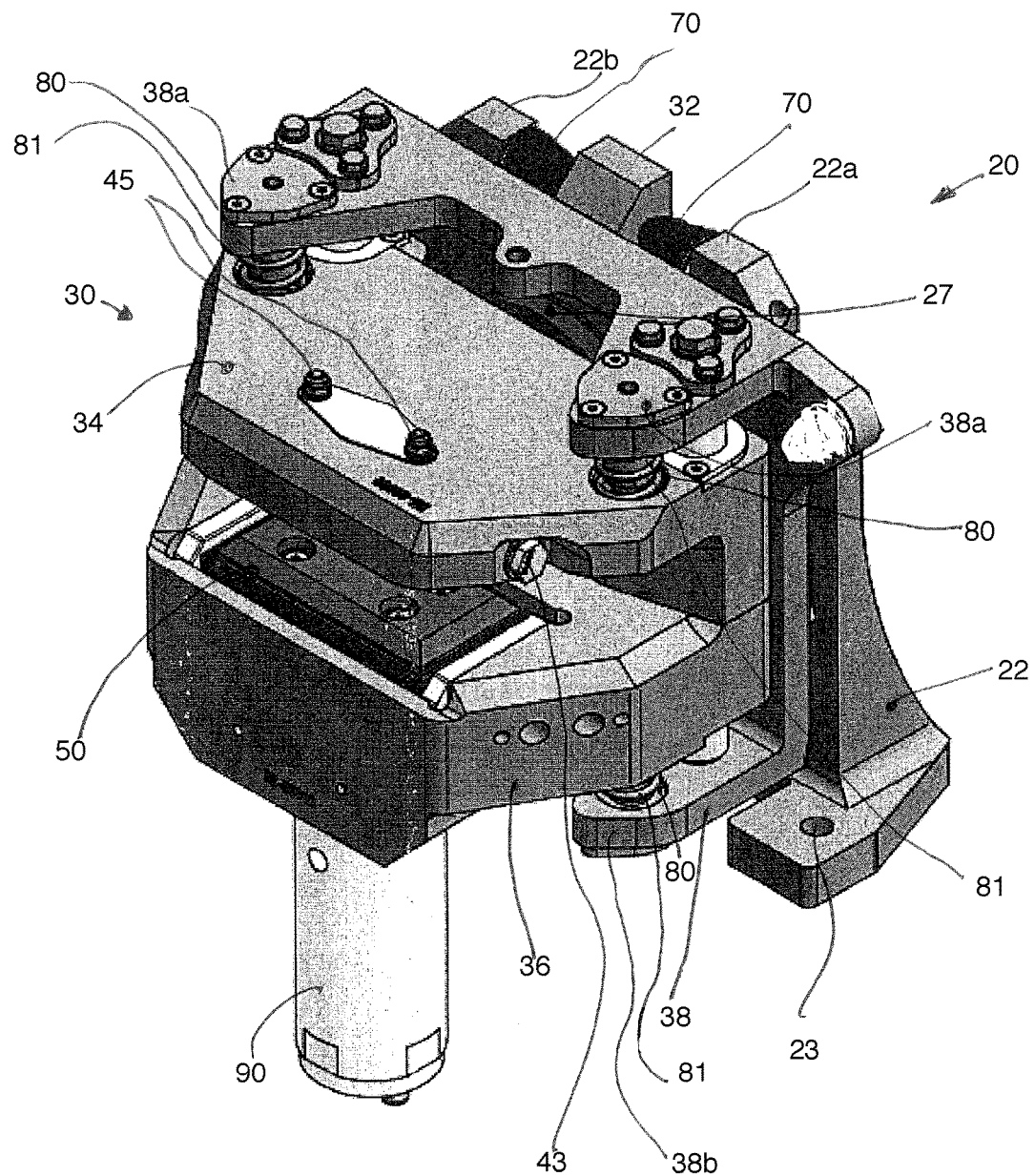
FIG. 1 is a line drawing evidencing a perspective view of a brake device, and how this may be fastened at rail-guided vehicles in amusement park devices.

The present invention has the purpose to provide an amusement park device of the type mentioned at the outset in which a powerful and effective brake device is fastened at the vehicle itself such that the vehicles can be braked and stopped at any desired point of the rail-guided route course.

This objective is attained in an amusement park device showing the features of claim 1.

Further developments of the invention are the objective of the dependent claims.

The amusement park device according to the present invention therefore shows essentially a vehicle guided at a rail, which itself is equipped with a braking device, namely at least one, preferably two brake pads fastened at a brake pad carrier for braking and/or clamping tight the vehicle at a point of the rail-guided route course in the event of braking. Here, the brake device comprises a brake carrier, which is arranged fixed at the vehicle itself.

Additionally the brake device comprises pivoting means, by which the brake pad carrier and/or at least two brake pads can be pivoted in reference to a fixed brake carrier and thus can be pivoted in reference to the vehicle.

By providing such a pivoting means it is easily made possible that the brake device can compensate even tight curves in rollercoasters as well as unevenness and tolerances in the rail-guided route course.

In one embodiment the pivoting means are embodied such that the brake pad carrier is pivotal parallel in reference to the rail over the rail-guided route course. Here, parallel in reference to the rail indicates that the brake pad carrier can be pivoted both about a predetermined angle in the direction of travel of the vehicle towards the front, but also towards the back.

Here it has proven beneficial that the brake pad carrier is pivotal about at least from +/−5° to +/−15° in the direction of travel of the vehicle and opposite thereto on the rail-guided route course.

In one embodiment of the invention a swivel pin is provided for pivoting the brake pad carrier, which is connected being fixed on or at the brake carrier, also connected being fixed to the vehicle. For this purpose the swivel pin comprises a cylindrical exterior contour with a circumferential and projecting flange. The brake pad carrier annularly encompasses here the circumferential flange and is rotationally supported via a slip ring at the cylindrical exterior contour of the swivel pin.

In order to limit the pivoting motion of the brake pad carrier in the direction of travel towards the front and the back, in a further development of the invention a first stop and a second stop are provided at the brake carrier, abutted by a stop pin of the brake pad carrier according to the predetermined, maximum pivoting angle.

Between the above-mentioned first stop and the second stop on the one side and the stop in on the other side, particularly for the purpose of noise reduction, suitable buffer elements may be provided, for example rubber buffers.

Another preferred embodiment of the invention provides that the brake pad carrier comprises a first brake caliper for fastening the first brake pad and a second brake caliper for fastening the second brake pad. In order to compensate height tolerances, it is here beneficial to support the first brake caliper and the second brake caliper each in a brake caliper console in a floating fashion.

Such a floating support can also be realized for example in that both at the first brake caliper and the second brake caliper respectively spring-loaded pins are provided as guides, with these pins being held at the brake caliper console.

In one embodiment of the invention both the first brake caliper as well as the second brake caliper are respectively provided with a gliding element or holding element at which the first and second brake pad are each fastened. Each of these parts, hereinafter called fastening element, comprises an arched exterior contour at its main area facing away from the respective brake pad, which corresponds in a form-fitting fashion to a second gliding element or fastening element fixed at the respective brake caliper, for example by way of screws, such that the respective brake pad is supported in a pivoting fashion.

The above-mentioned arched exterior contour is here preferably selected such that the brake pads each pivot towards the right and the left perpendicularly in reference to the rail extension and thus also perpendicular to the direction of travel of the vehicle, thus they can glide. Practical tests have shown that here the two brake pads shall be pivotal perpendicular in reference to the travel direction of the vehicle at an angle from approximately +/−1° to approximately +/−5° in order to ensure optimal adjustment of the brake pads to unevenness of the rail route course.

With the present invention it is possible that the two brake pads in the idle state of the brake device and thus when the brake device is open show a distance from each other amounting to >10 mm, preferably even >approx. 30 mm. In conventional brake devices with brake pads these distances are considerably lower, namely usually measuring less than 10 mm.

In order to adjust the brake pads, that means moving the brake pads towards each other, in principle arbitrary adjustment devices may be provided. However, it is advantageous in the device according to the invention to fix one of the two brake pads, except for the above-mentioned pivoting by a few degrees, axially stationary on the brake pad carrier and only adjust the opposite brake pad with a suitable adjustment device. In principle, various adjustment devices may be used as adjusting means. However, hydraulic, pneumatic, or electromagnetic adjustment units are particularly beneficial.

The present invention is explained in greater detail based on several figures in conjunction with a concrete exemplary embodiment of a brake device.

DETAILED DESCRIPTION OF THE FIGURES

Figure 2:
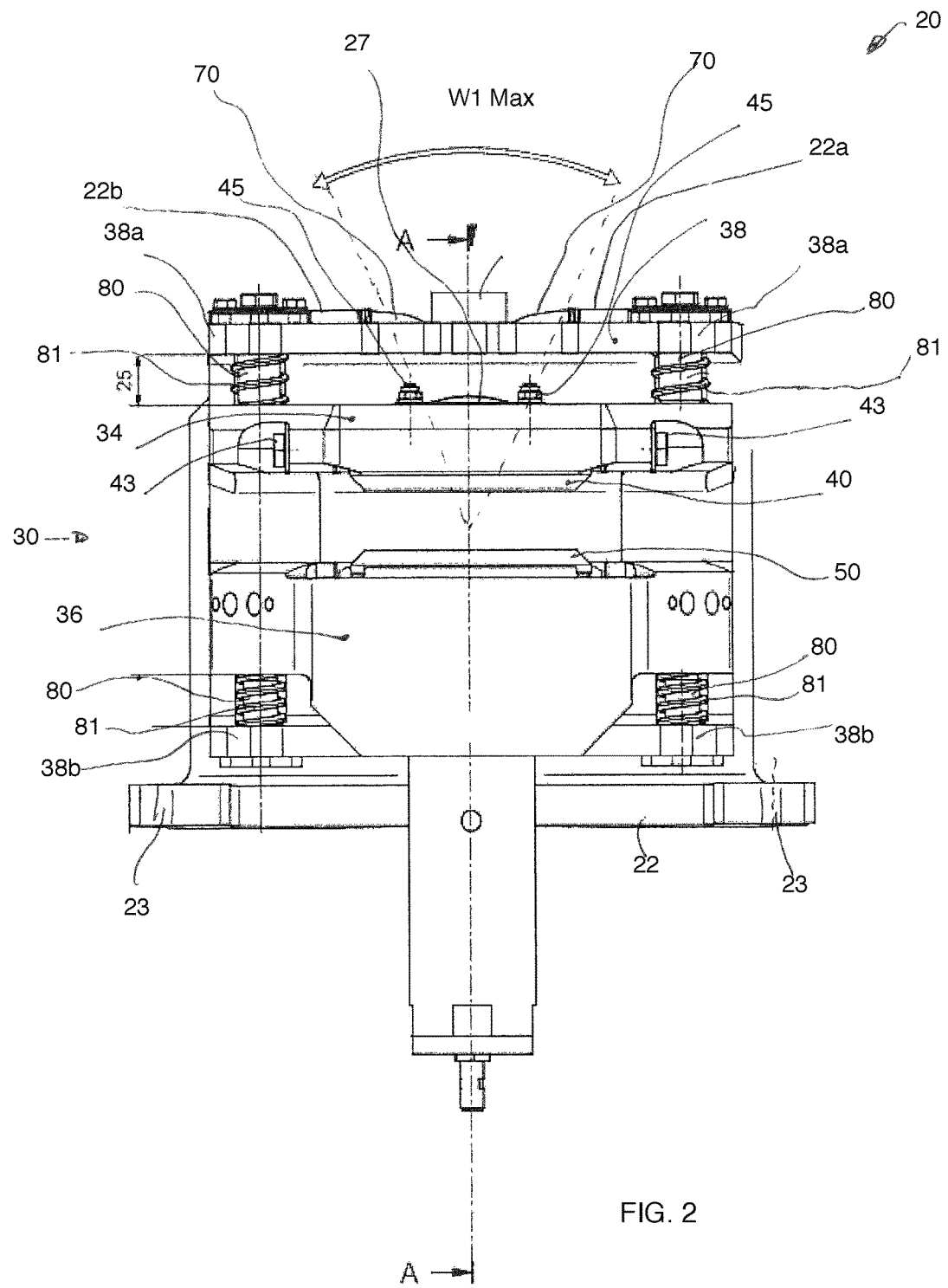
FIG. 2 is a line drawing evidencing a front view of the brake device of FIG. 1 with a view of the clamping side of the brake pads.
Figure 3:
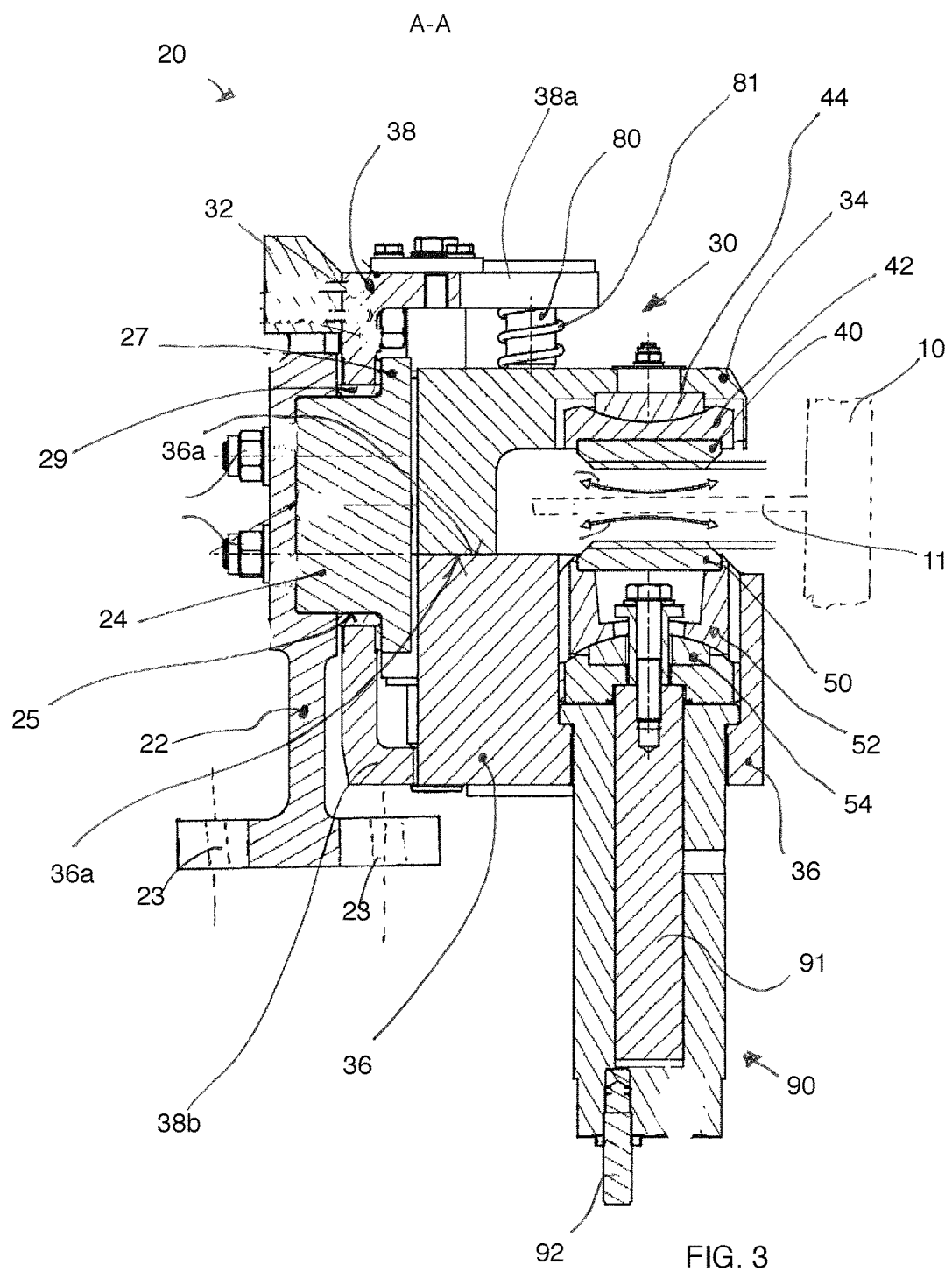
FIG. 3 is a line drawing evidencing a cross-section along the line A-A of FIG. 2.

FIGS. 1 to 3 show a brake unit used in rail-guided vehicles in amusement park devices, particularly rollercoasters or the like. Here, the brake device is characterized in two particular features, which are explained in detail in the following. A particular feature comprises that the brake device shows pivoting means, in order to optimally adjust the brake pads inserted here to the rail-guided route course, which may also show tolerances and unevenness. The second particular feature comprises that the brake pads in the idle state of the brake device are distanced relatively far from each other so that even in case of imprecisions and tolerances in the route course of the rail undesired friction loss is prevented, caused by brake pads unintentionally contacting the rail and grinding thereat.

The brake device in FIGS. 1 to 3 comprises a plate-shaped brake carrier 22, which ends at its bottom end, seen in a cross-section, in a T-shaped fashion and here comprises bore holes 23. These bore holes 23 in the brake carrier 22 serve for fastening the brake carrier 22 at the vehicle, for example via screws. The brake carrier 22 is therefore connected fixed to the vehicle, which is guided at the rail in amusement park devices, such as rollercoasters. At the end of the brake carrier 22 opposite the bore holes 23, i.e. respectively at the top in the illustrations shown in FIGS. 1 to 3, the brake carrier 22 ends with two projections or stops 22a and 22b, distanced from each other. A buffer element 70, explained in the following, is located at each of these projections 22a, 22b such that the buffer element 70 allocated to the stop 22a points in the direction of the opposite stop element 22b with the here located buffer element 70.

A disk-shaped recess is implemented in the main area of the brake carrier 22, located at the right in FIG. 3, with a swivel pin 24 engaging it in a form-fitting fashion. This swivel pin 24 is screwed fixed via screws 26 at the brake carrier 22 and thus in the finally assembled state connected fixed to the brake carrier 22. The swivel pin 24 comprises a cylindrical exterior contour 25, which clearly projects beyond the main area of the brake carrier 22 shown at the right in FIG. 3, and which ends with a flange 27 projecting annularly at the exterior perimeter. A slip ring 29 is located on the cylindrical exterior contour 25 of the swivel pin 24 between the annular flange 27 of the swivel pin 24 and the brake carrier 22.

The brake device 20 further shows a brake pad carrier 30, which is pivotal about this pivotal pin 26. For this purpose, the brake pad carrier 30, at which two brake pads 40, 50 are fastened in a manner to be explained, is provided with brake caliper console 38, which in the cross-section of FIG. 3 is embodied in a C-shaped fashion, and, with its central part, showing an opening, engages the flange 27 of the swivel pin 24, and here rests on the slip ring 29. Consequently by this embodiment the brake caliper console 38 can rotate about the swivel pin 24. In order to limit the pivoting angle of the brake caliper console 38, the brake caliper console 38 comprises a stop pin 32 at its upper end, which engages between the two above-mentioned buffer elements 70. The maximum pivoting angle $W1_{max}$ of the brake caliper console 38 and thus the brake pad carrier 30 is predetermined by the distance of the two stops 22a and 22b of the brake carrier 22, on the one side, and the width of the stop pin 32, on the other side, as well as through the dimensions of buffer elements 70.

As particularly clearly discernible in the perspective illustrations of FIG. 1 and the cross-sections of FIG. 3 the brake caliper console 38 shows two upper arms 38a, extending from the brake caliper 22 towards the right (see the cross-section of FIG. 3) and extending via two lower arms 38b, also away from the brake carrier 22.

A brake caliper in the form of an upper first brake caliper part 34 and a lower second brake caliper part 36 is placed between these upper arms 38a and the lower arms 38b of the brake caliper console 38.

The two brake caliper parts 34, 36 are guided via two pins 80, with the pins 80 being connected fixed at the above-mentioned upper arms 38a and the lower arms 38b of the brake caliper console 38, for example via suitable screws. Springs 81 for example helical springs, are guided about a total of two pins 80. The two brake caliper parts 34, 36, embodied at least approximately in an L-shaped fashion, are fixed in their position in a floating fashion by the springs 81. The contact areas of the brake caliper parts 34, 36 are marked with the reference characters 34a, 36a.

The pressure springs 81 respectively guided about the pins 80 overall ensure the floating support of the two brake caliper parts 34, 36. This means, that in case the two brake caliper parts 34, 36 are stressed they can jointly deflect upwards or downwards such that an axial motion of the two brake caliper parts 34, 36 is possible.

The first brake caliper part 34, which in the exemplary embodiment shown is the upper brake caliper part 34, fastens the first brake pad 40, embodied in a plate-shaped fashion, in a cup-shaped recess at the end of the first brake pad 40 shown at the right in FIG. 3. For this purpose the first brake pad 40 is connected to a first fastening element 42, for example via suitable screws (not shown). This first fastening element 42 shows an arched exterior contour on its upper side facing away from the brake pad 40, as particularly clearly discernible in FIG. 3. This arched exterior contour of the first fastening element 42 corresponds to a respective arching at a second fastening element 44. This second fastening element 44 is screwed fixed via screws 45 to the first brake caliper part 34.

The first fastening element 42 is connected to the second fastening element 44 via laterally inserted screws 43 such that a tipping motion of the first fastening element 42 is possible in reference to the second fastening element 44 about an angle W2, as indicated in FIG. 3. This angle W2 can be selected from +/−1° to approx. +/−5°, allowing the first brake pad 40 to laterally pivot back and forth about the above-mentioned angle.

The second brake caliper 36 also shows a cup-shaped recess, which however is embodied deeper than the recess in the first brake caliper part 34. The second brake pad 50 projects with its friction coating out of this recess of the second brake caliper part 36, fastened via a first, cup-shaped fastening element 52 at a second fastening element 54. The first fastening element 52 in turn comprises a hollow-walled, arched exterior contour, which corresponds to an appropriately arched exterior contour of the second fastening element 54 such that the second brake pad 50 can be pivoted about an angle W3, as indicated in FIG. 3. This angle W3 can also be selected from +/−1° to +/−5°, for example. The first fastening element 52 and the second fastening element 54 are in turn connected to each other via screws (not shown) such that pivoting the second brake pad 50 is possible about the angle W3.

Unlike the fastening of the first brake pad 40 at the first brake caliper part 34, the second brake pad 50 can be moved axially upwards and downwards via an adjustment unit 90, in the present case a hydraulic adjustment unit. For this purpose, the adjustment unit 90 comprises an internal piston 91, which is mechanically coupled to the second fastening element 54.

When the piston 91 is lifted via a pressure means supplied to the connection 92, this results in that the second fastening element 54 also being lifted and the first fastening element 52 entrains the second brake pad 50. The second brake pad 50 can therefore be moved in the direction of the first brake pad 40.

In order to brake a vehicle equipped with this above-explained brake device 20, the adjustment unit 90 in FIG. 3 must be moved upwards such that it can clamp at a rail part of a rail 10 of a rollercoaster or the like. For this purpose, the rail 10 can here show a brake train 11 immersing between the brake pads 40, 50. When this brake train 11 is slightly tilted or the vehicle is inclined, for example in reference to this brake train 11, advantageously the two brake pads 40, 50 may perform a slight tipping motion according to the pivoting angle W2, W3 such that further an optimal clamping and thus an optimal braking of the vehicle are ensured.

As clearly discernible from FIGS. 1 to 3, in the idle state of the brake device the two brake pads 40, 50 are in a relatively widely opened state. The two brake pads 40, 50 may for example be distanced from each other from 10 mm to 30 mm. This is very advantageous in that the vehicle in the unbraked state can bridge wider unevenness of the rail 10 without here one of the brake pads 40, 50 grinding at the brake train 11 of the rail 10.

Based on the design of the brake device 20 shown with the above-mentioned pivotal pin 24 and the brake caliper console 38 arranged pivotally about the swivel pin 24, in addition to pivoting the individual brake pads 40, 50 also the pivoting of the entire brake pad carrier 30 is possible about the swivel pin 24.

The pivoting is limited however due to the design of the stop pin 32, the buffer 70, and the stops 22a and 22b of the brake carrier 22, for example to +/−10°. In FIG. 2 the brake device 20 is shown with unpivoted brake pad carriers 30.

Figure 4:
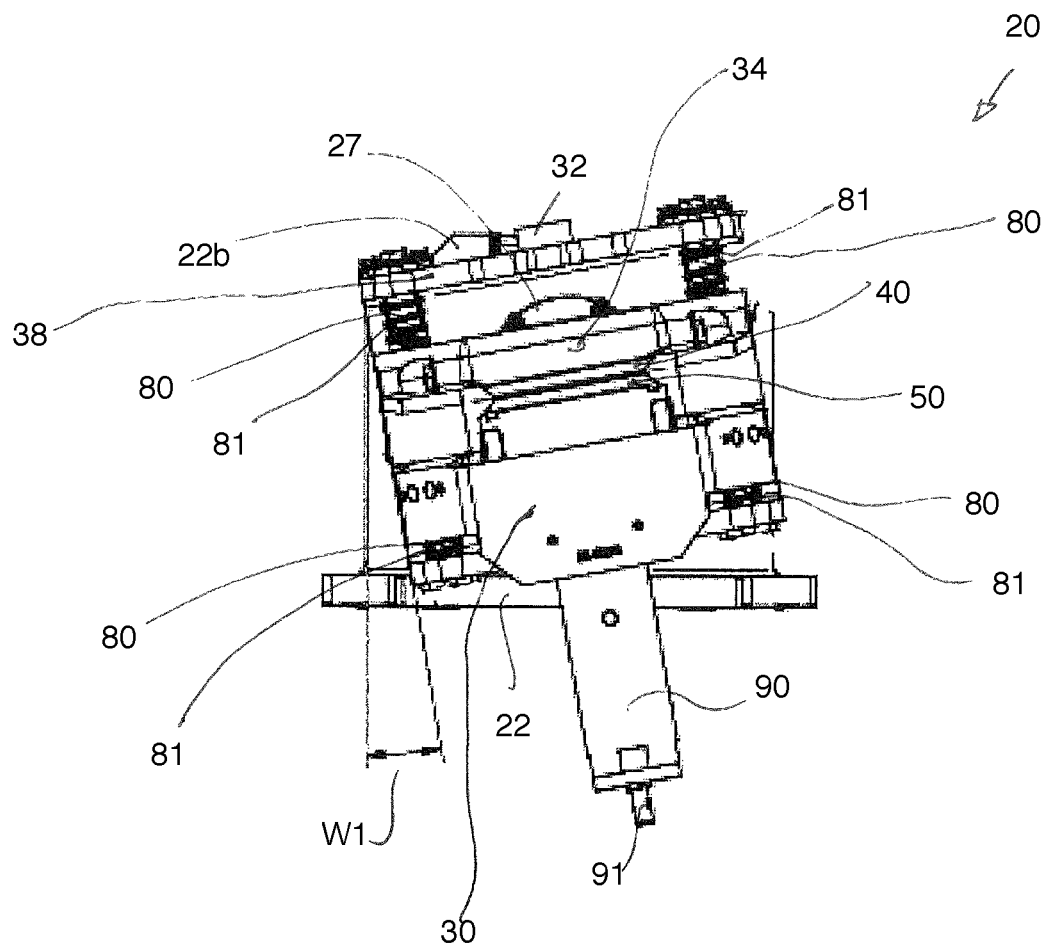
FIG. 4 is a line drawing evidencing a brake device of FIGS. 1 to 3, again with a view of the front side (clamping side), however in the pivoted state of the brake pad carrier.

FIG. 4 shows the brake device 20 with a view to the clamping side and thus from the front, with here the pivoting angle W1 being pivoted towards the right. Simultaneously FIG. 4 shows the brake device 20 in the braking state, thus when the brake pads 40, 50 are moved towards each other.

Although in the exemplary embodiment it was always stated that the brake device shows two brake pads 40, 50, the scope of the invention also includes use of only a single brake pad, which for the purpose of braking is pressed against a brake train 11 of the rail 10.

LIST OF REFERENCE NUMBERS

10 Rail
11 Brake train
20 Brake device
22 Brake carrier
22a First stop
22b Second stop
23 Bore holes
24 Pivotal pin
25 Cylindrical exterior contour
26 Screws
27 Flange
29 Slip ring
30 Brake pad carrier
32 Stop pin
34 First brake caliper part
34a Stop area
34b Stop area
36 Second brake caliper part
38 Brake caliper console
38a Upper arms of 38
38b Lower arms of 38
40 First brake pad
42 First fastening element
43 Screw
44 Second fastening element
45 Screw
50 Second brake pad
52 First fastening element
54 Second fastening element
70 Buffer element
80 Pin
81 Spring
90 Adjustment unit
91 Piston
92 Connection
W1 Pivoting angle
W2 Pivoting angle
W3 Pivoting angle
$W1_{max}$ maximum pivoting angle W1
A-A Cross-section The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing

We claim:

1. An amusement park device comprising a rail-guided route course as well as at least one vehicle guided on the rail, comprising a brake device with one or two brake pad(s) fastened at a brake pad carrier for braking or clamping tightly the vehicle at a point of the rail-guided route course in case of a braking situation, wherein the brake device comprises a brake carrier, which is arranged fixed at the vehicle, and a first pivoting means is provided by which the brake pad carrier is pivotal in reference to a fixed brake carrier and a second pivoting means is provided by which at least two brake pads are pivotal in reference to the brake pad carrier, wherein the brake carrier comprises a first stop and a second stop, at which a stop pin of the brake pad carrier contacts according to a predetermined maximum pivotal angle, and wherein the brake pad carrier further comprises a first brake caliper part for fastening the first brake pad and a second brake caliper part for fastening the second brake pad, wherein the first brake caliper part and the second brake caliper part respectively being supported floating in a brake caliper console such that the first and second brake caliper parts can jointly deflect an axial motion.

2. The amusement park device according to claim 1, wherein the brake pad carrier is arranged in a pivotal fashion parallel in reference to the rail on the rail-guided route course.

3. The amusement park device according to claim 1, wherein the brake pad carrier is pivotal by at least approximately +/−5° to +/−15° and in the direction of motion of the vehicle on the rail-guided route course and opposite thereto.

4. The amusement park device according to claim 1, further comprising wherein a pivotal pin is connected fixed to the brake carrier, that the swivel pin comprises a cylindrical exterior contour with a flange, circumferential and projecting therefrom, and that the brake pad carrier annularly encompasses the circumferential flange and is rotationally supported via a slip ring at the cylindrical exterior contour of the swivel pin.

5. The amusement park device according to claim 1, further comprising wherein a buffer element is arranged respectively between the stop pin of the brake pad carrier and the first stop on the one side and the second stop of the brake carrier at the other side.

6. The amusement park device according to claim 1, wherein both by the first brake caliper part as well as the second brake caliper part, spring-loaded pins are provided for the floating support, with the pins being held at the brake caliper console.

7. The amusement park device according to claim 1, wherein both the first brake caliper part as well as the second brake caliper part each show a fastening element at which the first and second brake pad are respectively fastened, with each fastening element comprising on a main area facing away from the respective brake pad an arched exterior contour, which corresponds in a form-fitting fashion to a second fastening element fixed at the respective brake caliper part such that the respective brake pad is supported in a pivotal fashion.

8. The amusement park device according to claim 7, wherein each of the two brake pads is pivotal perpendicular in reference to the direction of travel of the vehicle at an angle from approximately +/−1° to approximately +/−5°.

9. The amusement park device according to claim 1, wherein the two brake pads in the idle state of the brake device and thus when the brake device is open show a distance from >20 mm, preferably <30 mm in reference to each other.

10. An amusement park device according to one of claim 1, wherein only one of the at least two brake pads is axially adjustable via an adjustment unit.

11. An amusement park device according to claim 10, wherein the adjustment unit is a hydraulic unit or an electromagnetically operated adjustment unit.

12. An amusement park device comprising a rail-guided route course as well as at least one vehicle guided on the rail, comprising a brake device with one or two brake pad(s) fastened at a brake pad carrier for braking or clamping tightly the vehicle at a point of the rail-guided route course in case of a braking situation, wherein the brake device comprises a brake carrier, which is arranged fixed at the vehicle, and pivoting means are provided by which the brake pad carrier and at least two brake pads are pivotal in reference to a fixed brake carrier, wherein the brake carrier comprises a first stop and a second stop, at which a stop pin of the brake pad carrier contacts according to a predetermined maximum pivotal angle, and wherein the brake pad carrier comprises a first bake caliper part for fastening the first brake pad and a second brake caliper part for fastening the second brake pad, with the first brake caliper part and the second brake caliper part respectively being supported floating in a brake caliper console, wherein both by the first brake caliper part as well as the second brake caliper part, spring-loaded pins are provided for the floating support, with the pins being held at the brake caliper console.

13. The amusement park device according to claim 12, wherein the brake pad carrier is arranged in a pivotal fashion parallel in reference to the rail on the railguided route course.

14. The amusement park device according to claim 12 wherein the brake pad carrier is pivotal by at least approximately +/−5° to +/−15° and in the direction of motion of the vehicle on the rail-guided route course and opposite thereto.

15. The amusement park device according to claim 12, further comprising wherein a pivotal pin is connected fixed to the brake carrier, that the swivel pin comprises a cylindrical exterior contour with a flange, circumferential and projecting therefrom, and that the brake pad carrier annularly encompasses the circumferential flange and is rotationally supported via a slip ring at the cylindrical exterior contour of the swivel pin.

16. The amusement park device according to claim 12, further comprising wherein a buffer element is arranged respectively between the stop pin of the brake pad carrier and the first stop on the one side and the second stop of the brake carrier at the other.

17. The amusement park device according to claim 12, wherein both the first brake caliper part as well as the second brake caliper part each show a fastening element at which the first and second brake pad are respectively fastened, with each fastening element comprising on a main area facing away from the respective brake pad an arched exterior contour, which corresponds in a form-fitting fashion to a second fastening element fixed at the respective brake caliper part such that the respective brake pad is supported in a pivotal fashion.

18. The amusement park device according to claim 12, wherein each of the two brake pads is pivotal perpendicular in reference to the direction of travel of the vehicle at an angle from approximately +/−1° to approximately +/−5°.

19. The amusement park device according to claim 12, wherein the two brake pads in the idle state of the brake device and thus when the brake device is open show a distance from >20 mm, preferably <30 mm in reference to each other.

20. An amusement park device according to claim 12, wherein only one of the at least two brake pads is axially adjustable via an adjustment unit.

21. An amusement park device according to claim 20, wherein the adjustment unit is a hydraulic unit or an electromagnetically operated adjustment unit.

* * * * *